United States Patent [19]
Saldana

[11] Patent Number: 5,183,027
[45] Date of Patent: Feb. 2, 1993

[54] MODULAR BARBEQUE GRILL

[76] Inventor: Marshall Saldana, 3176 Golf Dr., San Jose, Calif. 95127

[21] Appl. No.: 800,608

[22] Filed: Nov. 27, 1991

[51] Int. Cl.⁵ .............................................. A47J 37/00
[52] U.S. Cl. ................................... 126/25 R; 126/9 R; 108/50; 108/157
[58] Field of Search .................. 126/9 R, 214 R, 9 B, 126/25 R, 25 A, 41 R, 30, 29, 25 AA, 299 R; 248/125, 150, 151; 108/50, 157, 150

[56] References Cited

U.S. PATENT DOCUMENTS

| | | | |
|---|---|---|---|
| 2,728,334 | 12/1955 | Paolella | 126/25 R |
| 2,816,538 | 12/1957 | Miller et al. | 126/25 R |
| 3,375,816 | 4/1968 | Chestnut, Jr. | 126/25 R |
| 3,491,744 | 1/1970 | Von Kohorn et al. | 126/25 R |
| 3,561,420 | 2/1971 | Paolella | 126/25 R |
| 3,742,838 | 7/1983 | Luschen et al. | 126/25 R |
| 3,834,370 | 9/1974 | Nelson | 126/30 |
| 4,616,624 | 10/1986 | Parker | 126/9 R |
| 4,635,613 | 1/1987 | Tucker et al. | 126/25 R |
| 4,759,276 | 7/1988 | Segroves | 126/25 R |
| 4,836,480 | 6/1989 | Besner | 126/30 |

*Primary Examiner*—James C. Yeung
*Attorney, Agent, or Firm*—John J. Leavitt

[57] ABSTRACT

Presented is a modular barbeque grill which may be fabricated in modular sub-assemblies for convenient relatively low cost shipping by the manufacturer to retail outlets or distributors for subsequent assembly by the purchaser. The modular barbeque grill includes a monolithic base unit, a monolithic firebox detachably mountable on the base unit and having a detachable grill, and, in one aspect, a detachable apron frame mounted on and surrounding the firebox and on which food products and utensils may be supported.

8 Claims, 2 Drawing Sheets

MODULAR BARBEQUE GRILL

BACKGROUND OF THE INVENTION

1. Field of the Invention

This invention relates to barbeque grills, and more particularly to a barbeque grill intended for permanent installation in a selected location.

2. Description of the Prior Art

A preliminary patentability and novelty search has revealed the existence of the following United States patents:

| | | |
|---|---|---|
| 2,728,334 | 3,491,744 | 3,561,420 |
| 4,635,613 | | 4,759,276 |

U.S. Pat. No. 2,728,334 relates to an outdoor barbeque grill built up from superposed courses of blocks or bricks to form a fire box. An apron having a central aperture is formed to surround the top course of blocks or bricks. A grill member to support food to be grilled is placed over the upper end of the firebox thus formed. Transverse rods extending between opposite ends of the grill structure below the top course of blocks or bricks support a second grill on which may be supported the fuel for the barbeque grill. An opening is provided at the bottom of the firebox to supply air to the combustion chamber.

U.S. Pat. No. 3,491,744 is a more complex structure than the one previously described, and provides an apron on which food may be served. This grill provides a main firebox that doubles as an ash receptacle and as a support for the food grill and surrounding apron. Wheels on the bottom of the firebox provide for mobility of the structure.

U.S. Pat. No. 3,561,420 has a firebox built up from blocks or bricks as in U.S. Pat. No. 2,728,334, and includes a masonry apron about the grill.

U.S. Pat. No. 4,635,613 is built as a cart or portable outdoor barbeque grill including a combustion chamber covered by a grill, and provided with a surrounding apron on which utensils and food may be supported.

U.S. Pat. No. 4,759,276 relates to a collapsible barbeque structure that is assembled from a free-standing table. The cooking elements, including the firebox, are recessed into the table top and a container of LP gas is positioned under the table to fire the barbeque grill.

As will be seen from a cursory review of the prior art, it is surprising that nobody appears to have conceived of and fabricated a barbeque grill structure that is intended for permanent installation in a selected location, yet which is modular in its conformation so that it may readily be sold in a knocked-down or disassembled condition for assembly by the ultimate consumer. Accordingly, it is one of the objects of this invention to provide such a barbeque grill structure.

Another object of the invention is the provision of a modular barbeque grill structure that is readily assembled for use by the ultimate consumer.

A still further object of the invention is the provision of a fixed-in-place barbeque grill that may readily be assembled for use, and disassembled for storage or cleaning.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the barbeque grill of the invention comprises a prefabricated base unit adapted to be bolted to a supporting structure such as a concrete slab, a firebox adapted to be detachably secured to the base unit in an elevated position for comfortable access, a grill unit detachably mountable on the firebox, and a detachable apron framework adapted to be mounted about the upper periphery of the firebox. Several different types of covering materials, such as tile or concrete may be applied to the upper surface of the apron framework to provide a surface on which dishes, utensils and other barbeque paraphernalia may be placed during use of the barbeque grill of the invention. In a preferred form of the invention, the apron framework is provided with ceramic tile.

DESCRIPTION OF THE PREFERRED EMBODIMENT

Figure 1:
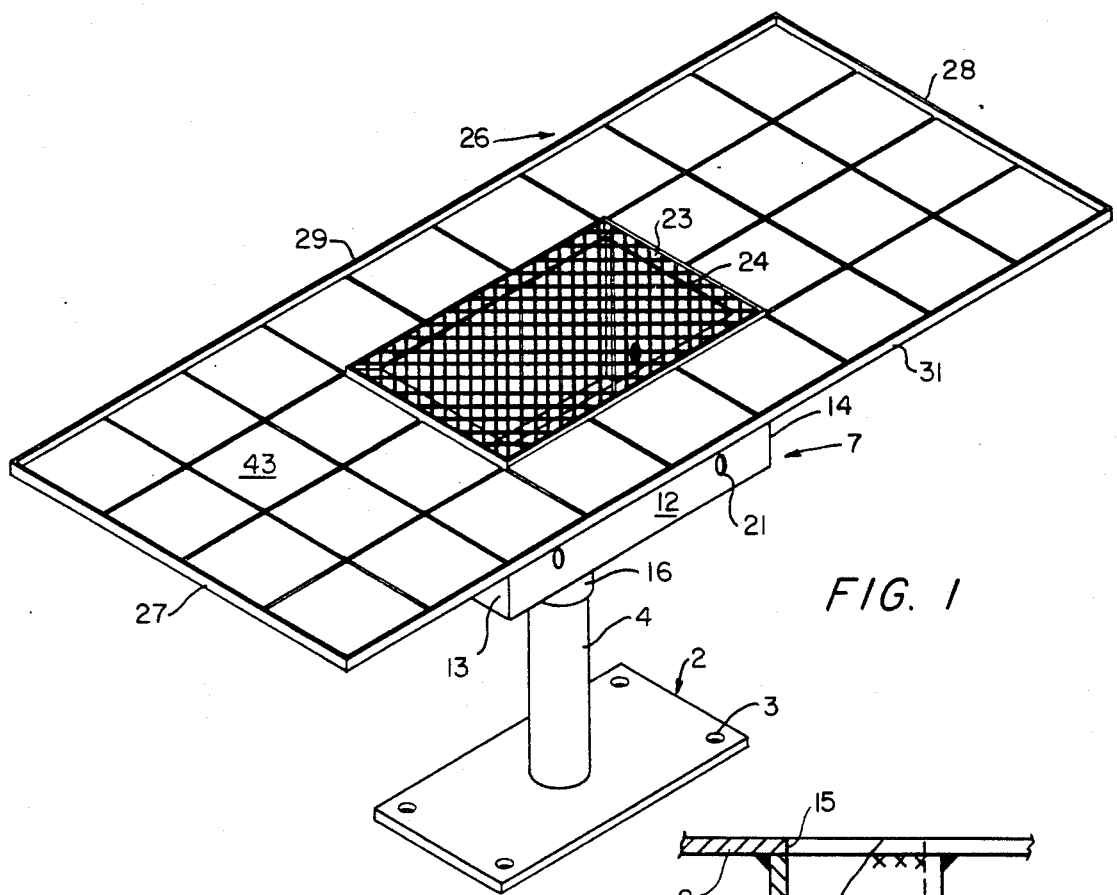
FIG. 1 is a perspective view of the assembled barbeque grill of the invention.
Figure 3:
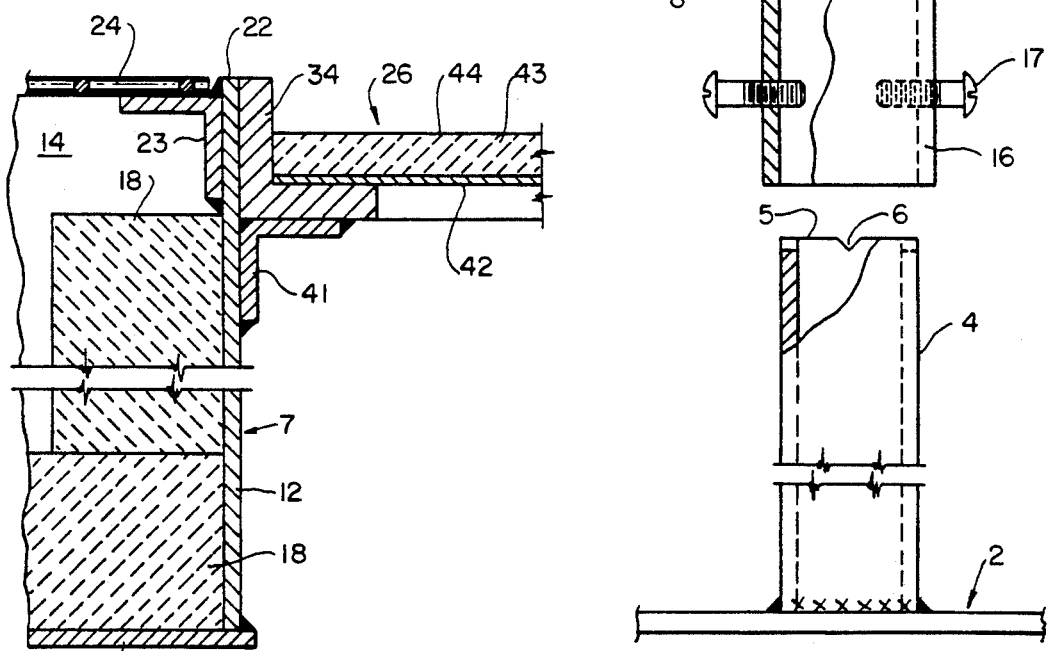
FIG. 3 is a fragmentary cross-sectional view illustrating the support means for the grill in relation to the firebox so that the grill will lie flush with the upper peripheral edge of the firebox, and illustrating the support means for the apron framework on the exterior periphery of the firebox.
Figure 4:
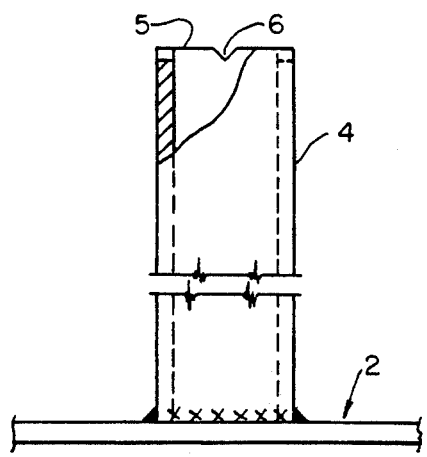
FIG. 4 is a fragmentary cross-sectional view illustrating the manner of attachment of the mounting sleeve to the firebox and detachable engagement of the firebox mounting sleeve to the base unit pedestal.
Figure 2:
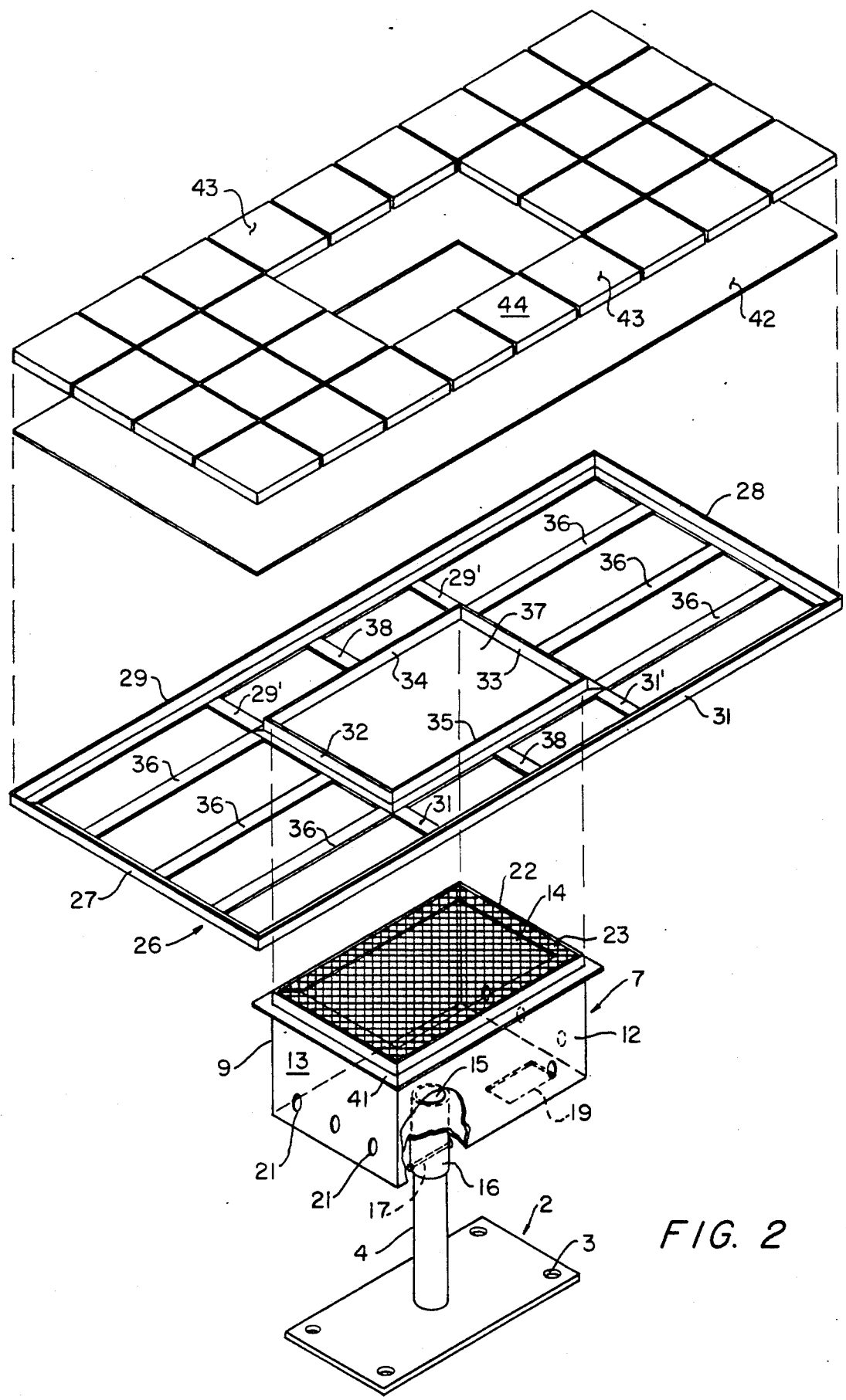
FIG. 2 is a perspective view in exploded form showing the structure and relationship of the separate elements of the combination making up the barbeque grill of the invention.

In terms of greater detail, the barbeque grill of the invention preferably comprises a flat rectangular base plate designated generally by the numeral 2, and having four mounting holes 3 bored through the plate adjacent each of the four corners as shown. The base plate is conveniently approximately 12" wide and 18" long, and fabricated from ½" steel. Welded, or otherwise secured, to the center of the steel base plate is a pedestal 4, formed preferably from Schedule 40 steel pipe having an outside diameter of approximately 3". The pipe pedestal is conveniently about two feet in length and projects upwardly from the base plate to terminate in an upper end edge 5 having at least four V-shaped indentations 6 formed therein at 90 degree intervals about the end of the pipe pedestal for a purpose which will hereinafter be explained.

The firebox is designated generally by the numeral 7, and comprises a generally rectangular box having a bottom 8, side walls 9 and 12, and end walls 13 and 14, formed from steel at least ⅛" thick and all welded into a monolithic structure to form a firebox closed on all sides except the open upper end. Welded, or otherwise secured, to the center of the bottom wall 8 on the exterior of the firebox about an aperture 15 formed therein, and projecting downwardly as shown, is a mounting sleeve 16 formed preferably from Schedule 40 steel and having an outside diameter of approximately 4" and a length of approximately 6". As shown, the mounting sleeve is mounted from one of its ends to the underside of the firebox, and adjacent its opposite or free end is provided with at least two diametrically opposed cap screws 17 spaced up from the associated end of the sleeve by about 2" to 3". The cap screws are threaded into the side wall of the mounting sleeve so that their shanks project into the interior of the mounting sleeve past the inner periphery thereof by at least a half inch. It will thus be seen, as shown, that when the mounting sleeve with firebox attached is slipped over the upper end of the mounting pedestal, the exterior periphery of the mounting pedestal fits snugly yet rotatably in the interior periphery of the mounting sleeve, and the shanks of the cap screws engage one or the other sets of indentations formed in the upper edge of the mounting pedestal. In this manner, the firebox may be rotated and reset in a different orientation in relation to the base plate to take advantage of the direction in which the wind might be blowing so that smoke from the barbeque is blown away from the person tending the barbeque during cooking.

On the inside of the firebox, the bottom, end and side walls are lined with a layer of firebrick 18, and in one corner of the firebox, the bottom wall is formed with an aperture 19 through which cold ashes may be removed from the interior of the firebox. Additionally, to provide a source of air to the interior of the firebox to enhance combustion of the fuel, usually charcoal briquettes, there is provided a number of ventilation apertures 21 in the side and end walls, the apertures spaced upwardly from the bottom wall about 2". It should be understood that the firebricks placed on the bottom wall 8 will normally cover the central aperture 15, the inner periphery of which has a diameter equal to the diameter of the inner periphery of the mounting sleeve 16, and will cover also, albeit removably, the ash-removal opening 19, so that during use, ashes do not escape from the firebox through these openings.

Within the inner periphery of the firebox adjacent the upper edge 22 thereof, on each of the end and side walls, there is welded a $\frac{1}{8}"\times\frac{3}{4}"\times\frac{3}{4}"$ steel angle bar 23 as shown. The angle bars form a platform or support for the outer edge portion of a rectangular grill member 24 dimensioned to fit snugly yet removably within the inner periphery of the firebox, and generally flush with the upper edge thereof. The grill member 24 is preferably fabricated from $\frac{1}{8}"\times\frac{1}{2}"\times\frac{1}{8}"$ stainless steel rod material to comply with the safety and health codes of most jurisdictions. It will thus be seen that with a quantity of charcoal briquettes as fuel resting on the firebrick-lined bottom of the firebox, food placed on the upper surface of the grill member will be exposed to the heat generated by the burning briquettes, and because the top surface of the grill is flush with the top surface of the firebox, the food may be easily basted during cooking, and may just as easily be removed from the grill for serving.

In some instances, the barbeque grill as described above may be all that is desired by some outdoor barbeque cooks for use as a basic unit. In other instances, for more elaborate outdoor barbeque cooking, such as to accommodate larger groups, there is provided an apron framework designated generally by the numeral 26, formed from appropriate steel members as will hereinafter be described, welded together to form a monolithic or unitary structure or framework. As shown, the framework 26 is preferably rectangular in configuration, having end rails 27 and 28, and side rails 29 and 31, preferably formed from angle iron, and having associated ends of the rails welded as shown to form corners defining the length and width of the apron framework. Preferably, one flange of each of the angle iron rails is oriented so that it extends inwardly.

The rectangular outer periphery of the frame thus formed is reinforced by the placement of two angle bars 32 and 33 extending transversely intermediate the two side rails 29 and 31, but having ends spaced therefrom as shown, the ends of the bars being welded to associated ends of flat extension members 29' and 31', respectively, the opposite ends of which are welded to the side rails as shown. The two angle bars are parallel and spaced apart an amount at least equal to the external long dimension of the firebox. Welded to the ends of the transversely extending intermediate angle bars 32 and 33 at their union with the extension bars 29' and 31', are two laterally spaced, longitudinally extending angle bars 34 and 35, each welded so that the upper surface of the laterally extending flange of each bar is flush with the corresponding surface of the transversely extending angle bars and the inwardly projecting flange of the associated end and side rails. Essentially the same construction is provided at each opposite end of the apron framework, where flat steel bars 36 are welded in laterally spaced relation and extend longitudinally between the associated end rails and transversely extending angle bars so that the upper surfaces of the bars 36 are flush with the outwardly projecting flanges of the angle bars 32 and 33 and the inwardly extending flanges of the side and end rails, to which the ends of the flat steel bars are welded.

It will thus be seen that there is formed a rectangular framwork within which there is formed by the reinforcing angle bars 32, 33, 34 and 35, a quadrilateral opening having a length between the mutually facing surfaces of the bars 32 and 33 sufficient to snugly accept the outer end walls 13 and 14 of the firebox. To snugly accept the side walls of the firebox, longitudinally extending bars 34 and 35 are spaced laterally parallel to the side rails 29 and 31, but spaced inwardly therefrom a distance sufficient to receive snugly therebetween the side walls of the firebox, as shown. It will thus be seen that the cross bars 32 and 33, and the longitudinally extending bars 34 and 35, frame an opening designated generally by the numeral 37, which when superimposed above the firebox and dropped about it, snugly receives the outer periphery of the firebox and seats itself by the outwardly projecting flanges of the angle bars 32, 33, 34 and 35 on the firebox. Short reinforcing cross bars 38 are welded between the side rails and the bars 34 and 35 intermediate the ends of the latter. The angle bars 32, 33, 34 and 35 thus frame a rectangular opening 37 in the apron framework 26 within which the upper end of the firebox is received.

To support the apron framework thus formed on the firebox, there is welded about the outer periphery of the firebox, specifically on each of the end and side walls thereof, an angle bar 41 that is spaced downwardly from the top edge 22 of each of the end and side walls and parallel thereto, one of the flanges of the angle bars being welded to the associated wall member, while the other flange extends outwardly perpendicular to the associated wall member. Collectively, the angle bars 41 form a beam about the upper open end of the firebox to strengthen and rigidify the firebox, and also function to form a seat or platform to support the apron framework 26 when it is dropped about the firebox. The spacing of the angle bars 41 is such that when the apron frame is deposited thereon, the top surfaces of the end and side rail flanges that form a rim about the apron framework, and the top edges of the bars 32-35 lie in a common plane. To complete the barbeque grill as depicted in FIG. 1, there is now deposited within the peripheral margins of the apron framework, a flat plate or sheet 42 of appropriate material, preferably sheet metal, but which may also be formed from wood or cementitious material capable of withstanding the temperature to which the metal side and end walls of the firebox will be raised during the cooking process.

The flat plate or sheet 42 serves to bridge the gaps between the reinforcing bars that form the apron framework, and also functions to provide a support for some other type of finishing materials, such as the tiles 43, which may be deposited on the flat plate or sheet, and abutted end-to-end and side-to-side, or spaced apart as shown, and the spaces between the tiles grouted with appropriate cementitious material to fill the spaces and form a flat and practicably indestructable surface 44 on the apron framework.

While I have described the preferred form of the modular barbeque grill structure as being easily assembled, and capable of being disassembled just as easily, it will of course be apparent to those skilled in the art that under appropriate circumstances it may be desirable that the components described above as being disassemblable be instead permanently welded together to form a composite yet unitary structure of great rigidity. Since the base unit including the pedestal constitutes one component, and the firebox with grill thereon constitutes a second component, while the apron frame constitutes a third component, it will be apparent that all that is required to form the structure into a rigid, permanently welded unit is to weld the pedestal to the firebox, and weld the apron framework to the side and end walls of the firebox.

For shipping purposes, it has become increasingly important that products, especially "hard goods" such as the barbeque grill forming the subject matter hereof, be capable of being shipped in disassembled form directly from the factory to the retail outlet, or from the manufacturer to a stocking distributor that, in turn, ships or delivers the package of disassembled product to the retail outlet. From the retail outlet, the customer takes the product home and, following appropriate directions provided with the merchandise, proceeds to assemble the product. This manner of merchandising has become popular because it shifts the burden of assembly to the ultimate consumer, reduces the size of shipping cartons, and thus saves expense at both the manufacturer's level and the retailer's level, and saves shipping costs because of the smaller packages.

The modular barbeque grill of the invention is particularly advantageous in this regard for the reason that it may easily be assembled into a compact package of disassembled components for shipping purposes. Thus, for shipping purposes, the apertures 3 in the base plate 2 may be used to fasten the base unit to an appropriate pallet (not shown). The firebox is then inverted, and arranged with its open end facing the base plate 2, and the pipe pedestal 4 projecting through the aperture 15 formed in the bottom of the firebox. Since the firebox is about 12" deep and the pedestal is about 24" long, only about 12" of the pedestal projects above the inverted bottom of the firebox, with half of this length projecting through the mounting sleeve 16. The cap screws may now be applied to the threaded bores in the mounting sleeve and tightened against the side wall of the pipe pedestal to detachably fasten these two components together against inadvertent release. The apron framework may now be dropped over this sub-assembly, and the remaining components placed on the upper surface of the apron framework, to be bound thereto by whatever means is used to enclose the assembly for shipping. For added security, the same means that secures the base plate 2 to the underlying pallet may also be used to secure the apron frame to the base plate 2, so that all major components of the barbeque grill are secured together for inclusion in a single shipping container.

Having thus described the invention, what is believed to be novel and sought to be protected by letters patent of the United States is as follows.

I claim:

1. A modular barbeque grill adapted to be shipped in disassembled modules for assembly by the purchaser, comprising:
    a) a base unit including a flat plate and a pedestal perpendicular thereto; and
    b) a firebox unit adapted to be detachably mounted on said pedestal and including an open upper end, and a grill on which food may be supported while being cooked operatively detachably mounted within said firebox adjacent said open upper end;
    c) said firebox unit including a rectangular bottom wall, opposed end walls integral with said bottom wall and projecting perpendicularly therefrom, opposed side walls integral with said bottom and end walls an perpendicular thereto, a centrally disposed aperture formed in said bottom wall symmetrical about an axis perpendicular to said bottom wall, a mounting sleeve having inner and outer peripheries centrally mounted perpendicularly on said bottom wall, the inner periphery of said mounting sleeve corresponding to the periphery of said centrally disposed aperture, and means on said mounting sleeve manipulable to support said firebox on the end of said pedestal remote from said base plate when in assembled condition, and manipulable to lock said firebox to said pedestal when in disassembled condition for shipping.

2. The combination according to claim 1, wherein the end of said pedestal remote from said base unit is provided with at least two pairs of diametrically opposed V-shaped notches, and said means on said mounting sleeve manipulable to support said firebox on said pedestal detachably engage said V-shaped notches, whereby said firebox may be rotated in relation to said base unit to selectively position said firebox by engagement of a selected pair of said notches.

3. The combination according to claim 1, wherein an apron frame is detachably supported on said firebox adjacent the open upper end thereof, said apron frame including an inner periphery detachably circumscribing said firebox and an outer periphery spaced from said inner periphery, and means supported on said apron frame forming a flat food and utensil supporting surface.

4. The combination according to claim 3, wherein said means supported on said apron frame forming a flat food and utensil supporting surface includes at least one flat base sheet supported between the inner and outer peripheries of said apron frame.

5. The combination according to claim 1, wherein air inlet ports are provided in said firebox end and side walls for admitting combustion air into said firebox.

6. The combination according to claim 4, wherein heat-impervious ceramic tile is mounted on said base sheet.

7. The combination according to claim 3 or 1 wherein a layer of firebrick is supported on the bottom wall within the firebox.

8. The combination according to claim 7, wherein an ash removal aperture is provided in the bottom wall of said aperture.

* * * * *